(12) United States Patent
Granström et al.

(10) Patent No.: US 8,726,400 B1
(45) Date of Patent: May 13, 2014

(54) EX POST FACTO REVIEW OF CLAIMS MADE AGAINST PROPRIETARY CONTENT IN A LIVE DATA STREAM

(75) Inventors: Johan Georg Granström, Zurich (CH); Gheorghe Postelnicu, Zurich (CH); Oliver Markus Heckmann, Baech (CH)

(73) Assignee: Google Inc., Mountain View, CA (US)

( * ) Notice: Subject to any disclaimer, the term of this patent is extended or adjusted under 35 U.S.C. 154(b) by 109 days.

(21) Appl. No.: 13/435,748

(22) Filed: Mar. 30, 2012

(51) Int. Cl.
*G06F 12/14* (2006.01)
*G06F 7/04* (2006.01)
*G06F 17/30* (2006.01)
*H04N 7/16* (2011.01)

(52) U.S. Cl.
USPC .............................. 726/26; 713/176; 709/203

(58) Field of Classification Search
None
See application file for complete search history.

(56) References Cited

U.S. PATENT DOCUMENTS

| | | | | |
|---|---|---|---|---|
| 8,010,511 B2 * | 8/2011 | Brock et al. | ................... | 707/694 |
| 8,185,576 B2 * | 5/2012 | Rose | ............................. | 709/203 |
| 2003/0009674 A1 * | 1/2003 | Pelly et al. | ..................... | 713/176 |
| 2012/0278326 A1 * | 11/2012 | Bauer | ........................... | 707/737 |

OTHER PUBLICATIONS

"Altnet Launches Global File Registry," P2P File Sharing, http://www.p2p-weblog.com/50226711/altnet_launches_global_file_registry.php, Last accessed Mar. 30, 2012.
"Global File Registry," Technical White Paper, Draft 1, May 26, 2006.

\* cited by examiner

*Primary Examiner* — Shin-Hon Chen
(74) *Attorney, Agent, or Firm* — Amin, Turocy & Watson, LLP (57) ABSTRACT

Systems and methods for detection and dispute management of claims made against proprietary content in a live data stream are provided in this disclosure. The system includes a reference stream generation component that updates a set of reference data streams based on an identification of data that is associated with non-live content (e.g., advertisements, flashbacks, etc.). Moreover, user generated content is compared with the set of reference data streams to facilitate identify the claims and a partner-defined policy is applied to the user generated content to facilitate dispute management and/or resolution.

20 Claims, 10 Drawing Sheets

EX POST FACTO REVIEW OF CLAIMS MADE AGAINST PROPRIETARY CONTENT IN A LIVE DATA STREAM

TECHNICAL FIELD

This disclosure relates generally to data processing, and more specifically to ex post facto review of claims made against proprietary content in a live data stream.

BACKGROUND

Streaming data has become more popular and useful in recent years due in part to improvements in data compression techniques, which have made transmission of large amounts of data via a network increasingly more feasible, due in part to improvements in memory technology (e.g., storage and processing). Commercial video-sharing sites have helped to popularize the streaming of data by enabling users to upload and share/broadcast their videos. While there have been improvements in technology relating to video sharing, there are still a number of challenges in being able to protect distribution of live data streams, for example, via a network (e.g., the Internet). Moreover, video-sharing sites monitor and manually review user uploaded data to facilitate authorized distribution of data and/or enforcement of rights associated with proprietary content. However, this can be a very long and tedious process.

Further, a claim is made against proprietary content when a match is detected between user uploaded data and a live data stream provided by an authorized content provider/owner. However, oftentimes the live data stream includes non-live segments, such as advertisements, flashbacks, etc. Moreover, claims can be incorrectly generated if the user uploaded data matches the non-live segments within the live data stream. The incorrectly generated claim can be disputed by the user; however dispute resolution can be a lengthy process, during which the user uploaded data is typically blocked, leading to user dissatisfaction.

SUMMARY

The following presents a simplified summary of the specification in order to provide a basic understanding of some aspects of the specification. This summary is not an extensive overview of the specification. It is intended to neither identify key or critical elements of the specification nor delineate any scope particular embodiments of the specification, or any scope of the claims. Its sole purpose is to present some concepts of the specification in a simplified form as a prelude to the more detailed description that is presented in this disclosure.

The systems in this disclosure include a memory that has stored thereon computer executable components and a processor that executes the computer executable components stored in the memory. In one aspect, the computer executable components include a reference stream generation component that updates a set of reference data streams based on an identification of data that is associated with non-live content, and a claim detection component that compares user generated content with the set of reference data streams to facilitate dispute management. Further, one embodiment of this disclosure relates to a method that comprises using a processor to execute computer executable instructions stored in a memory to perform acts including identifying a portion of known content within a live data stream, and generating a reference data stream by removing the portion of known content from the live data stream. In addition, the acts include comparing user generated content with the reference data stream to facilitate dispute management.

Furthermore, in another embodiment, this disclosure relates to a computer readable storage medium comprising computer-executable instructions that, in response to execution, cause a system to perform operations that comprise identifying a portion of known content within a live data stream, and generating a reference data stream by removing the portion of known content from the live data stream. Additionally, the operations comprise comparing user generated content with the reference data stream to facilitate dispute management.

The following description and the drawings set forth certain illustrative aspects of the specification. These aspects are indicative, however, of but a few of the various ways in which the principles of the specification may be employed. Other advantages and novel features of the specification will become apparent from the following detailed description of the specification when considered in conjunction with the drawings.

BRIEF DESCRIPTION OF THE DRAWINGS

Numerous aspects, embodiments, objects and advantages of the present invention will be apparent upon consideration of the following detailed description, taken in conjunction with the accompanying drawings, in which like reference characters refer to like parts throughout, and in which.

DETAILED DESCRIPTION

Embodiments in this disclosure relate to an efficient mechanism for ex post facto review of claims made against proprietary content in a live data stream. Live data streams can typically include high value content with rapidly diminishing value. Thus, user uploads (e.g., to a media sharing and/or hosting server) are to be matched against live data streams with very low latency. In one embodiment, a system disclosed in this specification facilitates accurately identifying claims against live portions of the live data streams. Further, the system facilitates detection of claims made in error (e.g., against the proprietary non-live portion of the live data stream), and provides an efficient mechanism for dispute resolution of such claims.

Various aspects or features of this disclosure are described with reference to the drawings, wherein like reference numerals are used to refer to like elements throughout. In this specification, numerous specific details are set forth in order to provide a thorough understanding of this disclosure. It should be understood, however, that the certain aspects of disclosure may be practiced without these specific details, or with other methods, components, materials, etc. In other instances, well-known structures and devices are shown in block diagram form to facilitate describing this disclosure.

It is to be appreciated that in accordance with one or more implementations described in this disclosure, users can opt-out of providing personal information, demographic information, location information, proprietary information, sensitive information, or the like in connection with data gathering aspects. Moreover, one or more implementations described herein can provide for anonymizing collected, received, or transmitted data.

Figure 1:
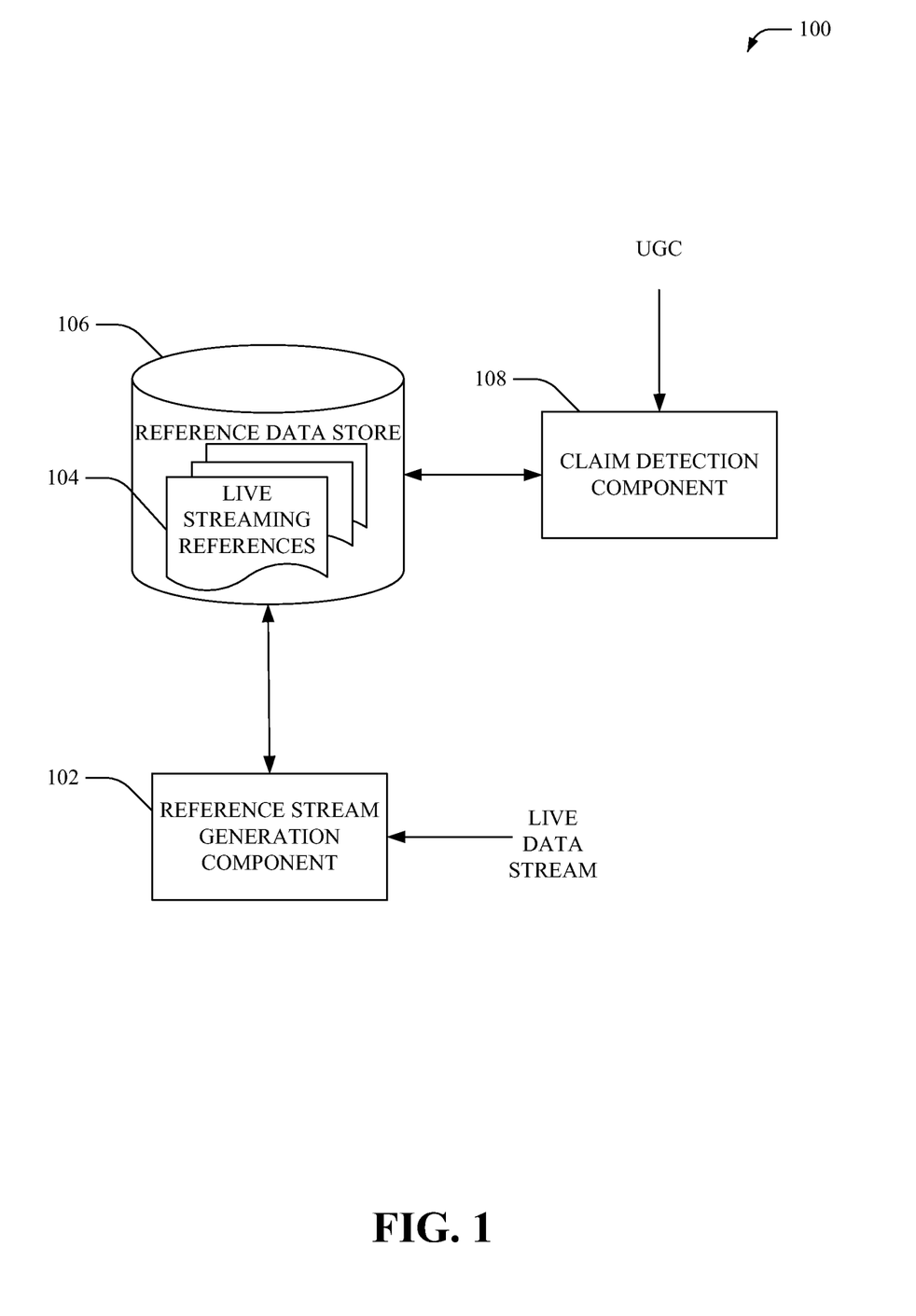
FIG. 1 illustrates a block diagram for an example system that facilitates detection of a claim against a live data stream in accordance with implementations of this disclosure.

Referring initially to FIG. 1, there is illustrated an example system 100 that facilitates detection of a claim against a live data stream, according to an aspect of this disclosure. As an example, system 100 can be utilized by and/or implemented within media hosting and/or media sharing platforms that facilitate broadcasting and/or sharing digital media content (e.g., audio and/or video content). Moreover, streaming digital media content has become popular in recent years due in part to improvements in data compression techniques making transmission of media content via a network (e.g., the Internet) increasingly more feasible, and improvements in memory technology (e.g., storage and processing). Media sharing services are capable of streaming media from a live event. For example, a media sharing service could host a live sporting event capable of being displayed to users of the media sharing service. When a media sharing service ingests a stream from a live event, it is desirable that the stream be immediately protected from other users of the media sharing service uploading the same content at the same time from any location worldwide. System 100 facilitates accurately identifying claims associated with user generated content (UGC) that match at least a portion of the digital media content.

According to an aspect, system 100 includes a reference stream generation component 102 that identifies one or more portions (e.g., segments, clips, etc.) from a live data stream that do not relate to live materials and creates a live streaming reference based on the remaining portions (e.g., live materials) of the live data stream. As an example a live data stream can include media content (e.g., audio and/or video data) associated with real-time, or near real-time, events (e.g., news, live sports events, live concerts, etc.). Moreover, it can be appreciated that the live data stream can include most any data that has a high value only for a short period of time and the value of which decreases with time (e.g., after the data is released, broadcasted, shared, etc.). In one example, the reference stream generation component 102 can receive the live data stream from partners, such as, but not limited to, content publishers, distributers, etc., via one or more networks (not shown). Moreover, the partners can hold rights (e.g., copyrights, exclusive rights, government grants, etc.) associated with at least portions of the live data stream. In one aspect, the reference stream generation component 102 can analyze the live data stream to detect one or more segments and/or portions within the live data stream that relate to proprietary non-live events, such as, but not limited to, advertisements, flashbacks, recaps, previously published previews/trailers, etc. Moreover, the reference stream generation component 102 can store the remaining segments and/or portions within the live data stream that relate to live events, as live streaming references 104 in a reference data store 106.

Further, system 100 includes a claim detection component 108 that receives user generated content (UGC), for example, data (e.g., audio and/or video content) uploaded, via one or more networks (not shown), by a subscriber to facilitate sharing, distribution, and/or broadcast of the data. In one aspect, the claim detection component 108 compares the UGC with the live streaming references 104 in the reference data store 106, to detect a claim against the UGC (e.g., assertion of rights associated with the live streaming references 104 held by the partner) based on at least a partial match. In one example, the claim detection component 108 can apply a partner-defined policy to the UGC, on detecting the claim. For example, the claim detection component 108 can block and/or delay (e.g., based on a predefined delay time) publishing of the UGC. In another example, the claim detection component 108 can track the UGC and provide metadata and/or statistical data relating to the UGC, to the partner. Since the live streaming references 104 do not include non-live media content, the accuracy and/or confidence that the claim is correctly made against the UGC is substantially increased.

It can be appreciated that the reference data store 106 can include volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable PROM (EEPROM), or flash memory. Volatile memory can include random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), and enhanced SDRAM (ESDRAM). The memory (e.g., data stores, databases, buffers, etc.) of the disclosed systems and methods is intended to comprise, without being limited to, these and any other suitable types of memory. As an example, the reference data store 106 (and/or other data stores/buffers disclosed herein) can utilize suitable data compression techniques to efficiently store media content.

Figure 2:
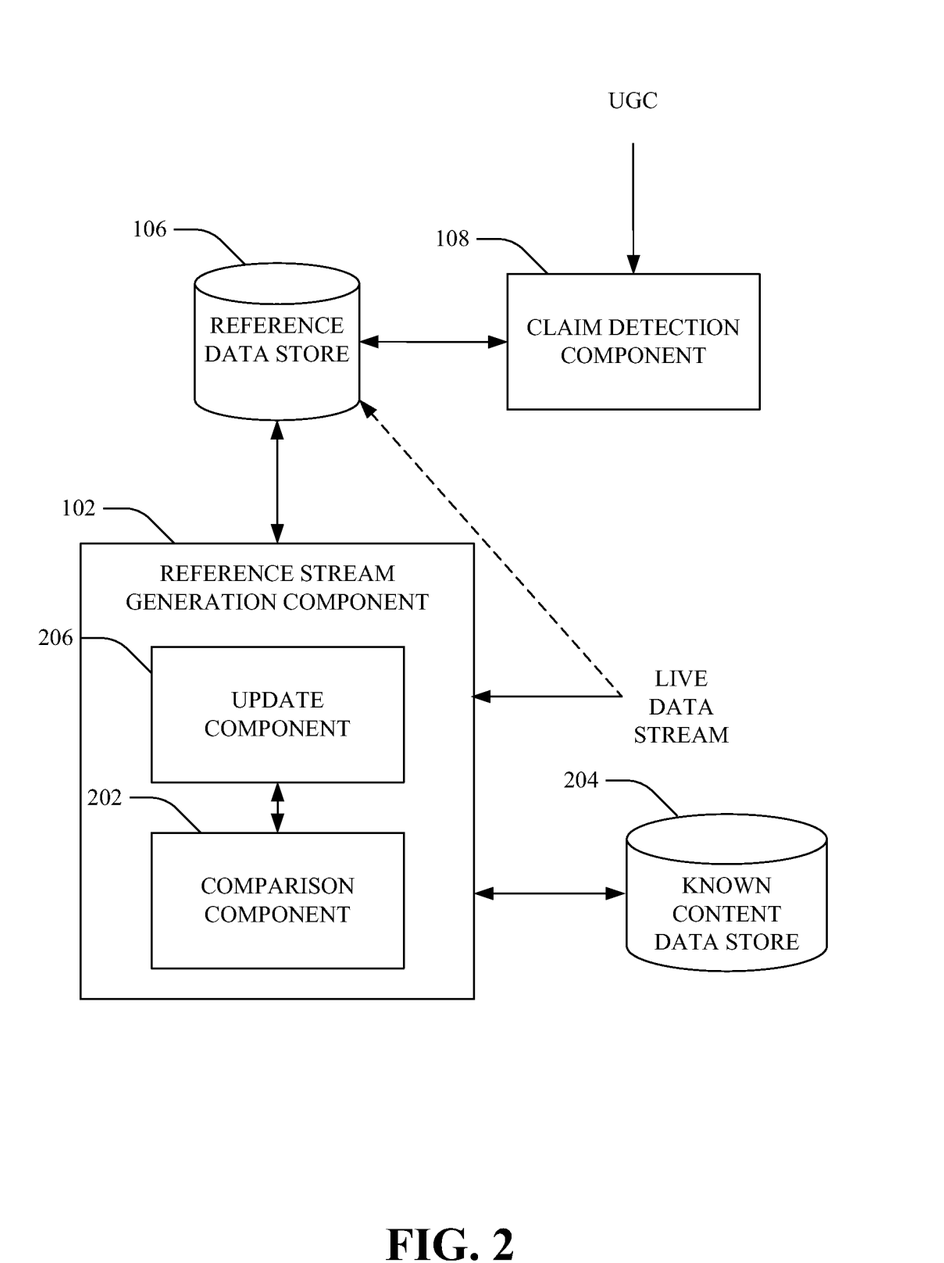
FIG. 2 illustrates an example system for generating reference data streams in accordance with implementations of this disclosure.

Referring now to FIG. 2, there illustrated is an example system 200 for generating reference data streams in accordance with various aspects and implementations of this disclosure. Live data streams, for example, relating to live events (e.g., live telecasts, first aired or published movies, etc.) often include high value content with rapidly diminishing value. Thus, system 200 facilitates comparison of user uploads (e.g., UGC) with live reference streams with very low latency. Moreover, the reference stream generation component 102, reference data store 106, and claim detection component 108, can include functionality, as more fully described in this disclosure, for example, with regard to system 100.

According to an embodiment, the live data stream provided by a partner (e.g., copyright holder) can include snippets associated with proprietary (non-live) materials (e.g., commercials, references to older media, etc.). As an example, the live data stream can be provided to the reference stream generation component 102 and/or incrementally stored within the reference data store 106. Moreover, the reference stream generation component 102 can obtain the live data stream (e.g., from the partner and/or from the reference data store 106) and create a reference stream that is utilized for claim detection, based on an analysis of the live data stream. In one aspect, the reference stream generation component 102 can include a comparison component 202 that can compare the live data stream and/or portions thereof, with previously stored data (e.g., media content) from a known content data store 204. By way of example, the known content data store 204 can include a repository of "known material", e.g., a portion of available media corpus. Moreover, if a portion of the live data stream matches existing data within the known content data store 204, then that portion cannot be considered to be live and/or high value.

As an example, the comparison component 202 can identify a match, or a partial match, with respect to an audio component and/or a video component of the live data stream. In addition, the comparison component 202 can identify a match, or a partial match, independent of the quality/resolution of the live data stream. In one example, the comparison component 202 can generate and compare a signature, hash, fingerprint, etc., of the live data stream with a signature, hash, fingerprint, etc. of the data stored within known content data store 204. According to an aspect, if a match is found, an update component 206 can modify the live data stream, for example, by removing the portion of data within the live data stream that is common with (or substantially common with) the known data. Moreover, the update component 206 can store the modified live data stream as a live streaming reference, within the reference data store 106. Further, if a match is not found (e.g., by the comparison component 202), the update component 206 can store the entire live data stream as a live streaming reference, within reference data store 106. As an example, update component 206 can store the live streaming reference(s) in a compressed format.

Further, the claim detection component 108 can compare the UGC against the live streaming references stored in reference data store 106. Similar to the comparison component 202, the claim detection component 108 can compare audio data and/or video data, independent of its quality. Further, the claim detection component 108 can generate and compare a signature, hash, fingerprint, etc., of the UGC with a signature, hash, fingerprint, etc. of the live streaming references. Since the live streaming references do not include proprietary non-live media, the claim detection component 108 can identify a claim and/or flag the UGC for further review, on detection of a match (or partial match) between the UGC and one or more the live streaming references. By way of example, further review can include applying a predefined policy (e.g., specified by the partner and/or a media sharing/hosting platform) to the UGC.

In one example, the comparison component 202 and/or claim detection component 108 can employ most any video and/or audio fingerprinting technique(s) to identify duplicates or near duplicates of media content. For example, in video fingerprinting, unique features of the video, also known as interest points, can be extracted and stored as a video fingerprint where the video fingerprint is a function of a set of interest points. Interest points can be based on extracted features such as a histogram of local features, a color histogram, edge features, a histogram of textons, face features, camera motion, shot boundary features, audio features, etc. Video fingerprints are generally much smaller than the actual video files themselves and thus the comparison of media content can be accomplished faster and more efficiently. Similar to video fingerprinting, in audio fingerprinting, unique features of an audio track, also known as interest points, can be extracted and stored as an audio fingerprint where the audio fingerprint is a function of a set of interest points. Interest points within an audio track can include unique spectral events, such as a spectral peak at a point in time or the onset of a spectral peak at a point in time. One type of audio fingerprint can be a melody fingerprint that includes interest points related to the melody of the audio track rather than to speech or other unique spectral events. Melody fingerprints can be used to identify an audio sample that includes common melody features however with other different audio features overlaying the melody. For example, a live broadcast of a sporting event may have common melodies related to the actual sporting event; however, include speech of differing languages overlaying the common melody. A melody audio fingerprint can assist in matching the common melody while ignoring other differing audio characteristics. Audio fingerprints are generally much smaller than the actual audio files themselves and thus comparison of audio fingerprints can provide an efficient and fast approach to media content comparison.

According to an additional or alternative embodiment, the partner can also provide a clean reference data stream (e.g., without non-live materials) that can be directly stored in reference data store 106 and utilized to facilitate claim detection (e.g., by the claim detection component 108). Further, the reference stream generation component 102 can receive input, for example, from a network operator and/or partner, explicitly indicating the non-live materials in the live data stream based on manual inspection. Furthermore, it can noted that system 200, in one example, can be implemented within or coupled to a media hosting and/or sharing platform.

Figure 3:
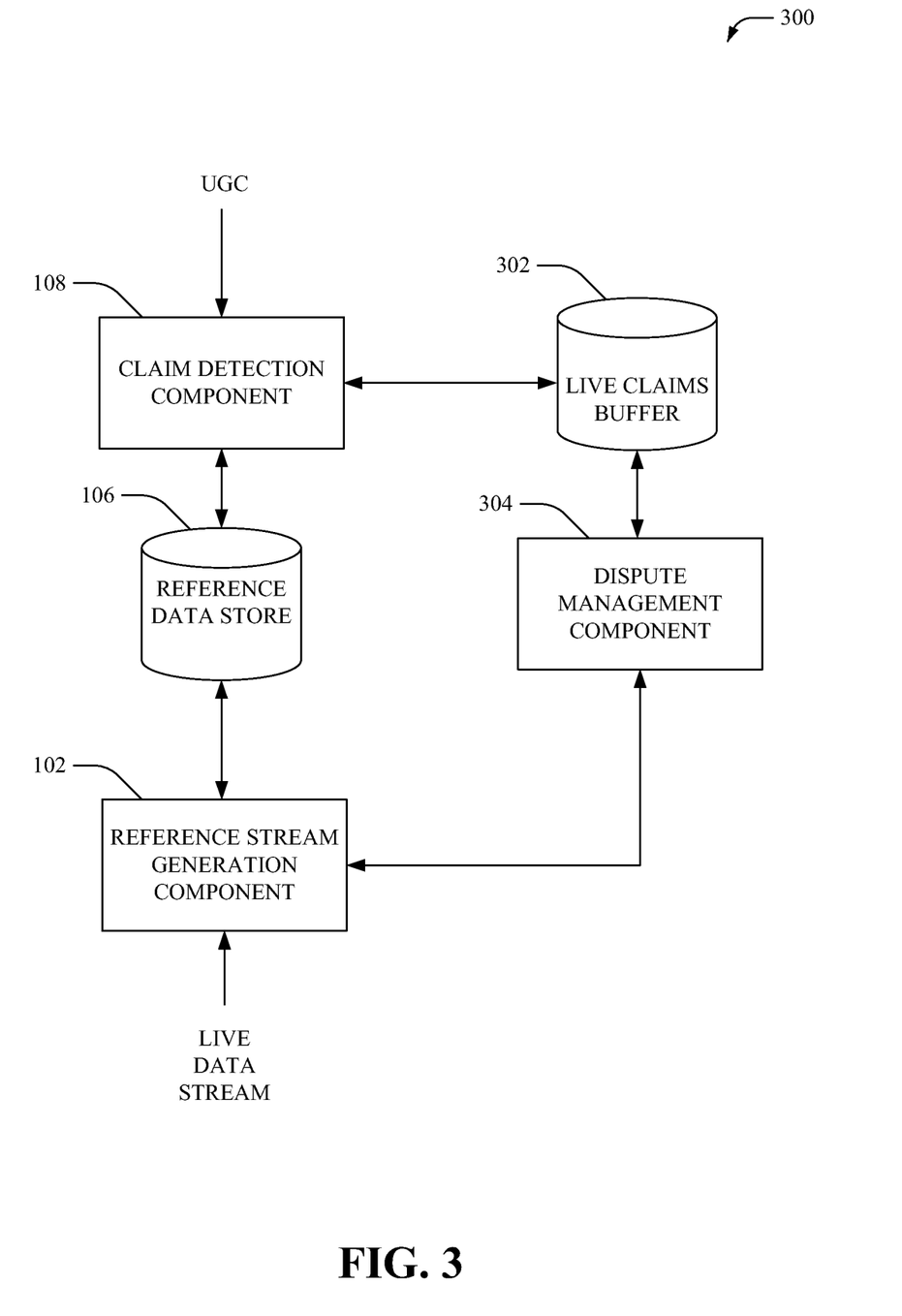
FIG. 3 illustrates an example system that can facilitate dispute management to ensure accurate assertion of rights on content that is owned by a partner in accordance with implementations of this disclosure.

FIG. 3 illustrates an example system 300 that can facilitate dispute management to ensure accurate assertion of rights on content that is owned by a partner, according to an aspect of this disclosure. As an example, system 300 can be utilized by a media sharing website, on which partners (e.g., rights holders) and users can upload, view, and/or share media content. Moreover, the reference stream generation component 102, reference data store 106, and claim detection component 108, can include functionality, as more fully described in this disclosure, for example, with regard to systems 100 and 200.

In one aspect, the claim detection component 108 can compare UGC against data within the reference data store 106 to identify a claim. Detected claims can be handled based on a predefined policy, for example, specified by a partner. According to an aspect, detected claims can be stored in a live claims buffer 302 and the UGC can be temporarily or permanently blocked. Moreover, the live claims buffer 302 can also store the UGC associated with a claim for a specific time period. As an example, the claim against a UGC can be disputed by a user (e.g., via user input), for example, as being made in error or being misidentified. As an example, a user is notified of a claim against the UGC, for example, via an interface (not shown) and in response the user can submit input data (e.g., fill a submission form) to dispute the claim.

In one aspect, a dispute management component 304 can facilitate resolution of disputed claims based on a partner-defined policy. In one example, if a claim is disputed by the user, the dispute management component 304 delays release of the UGC for a partner-defined time period. During this time, the partner can typically review (e.g., via a user interface) the dispute while the UGC remains blocked. By way of example, the partner-defined time period can be static and/or dynamic. For example, the partner-defined time period can be inversely proportional to a fraction of the partner's claims that were successfully disputed (e.g., a partner with a low fraction of claims being successfully disputed would be allowed a longer dispute timeout). This can avoid delays in releasing UGC associated with claims that have been made in error. In another example, the dispute management component 304 releases the UGC if the claim is disputed by the user, such that, the UGC can immediately (or substantially immediately) be broadcasted and/or shared. In this example scenario, the partner can explicitly reinstate the UGC, if incorrectly disputed. Moreover, if reinstated, the UGC can be blocked or delayed as per the predefined policy specified by the partner.

Further, in one aspect, the reference stream generation component 102 can detect portions of the live data stream that are in error, for example, that include known and/or non-live data. In addition to updating the reference data store 106, the reference stream generation component 102 can provide the error information to the dispute management component 304, for example, including the live data stream and/or known and/or non-live data within the live data stream. Moreover, the dispute management component 304 can lookup the live claims buffer 302 to identify whether the known and/or non-live data applies to any of the claims. If one or more claims associated with the known and/or non-live data are found, the dispute management component 304 can cancel the claims and release the UGC. As an example, the lookup by the dispute management component 304 can be slightly delayed as compared to the update of the reference data store 106 by the reference stream generation component 102, to avoid a race condition.

Figure 4:
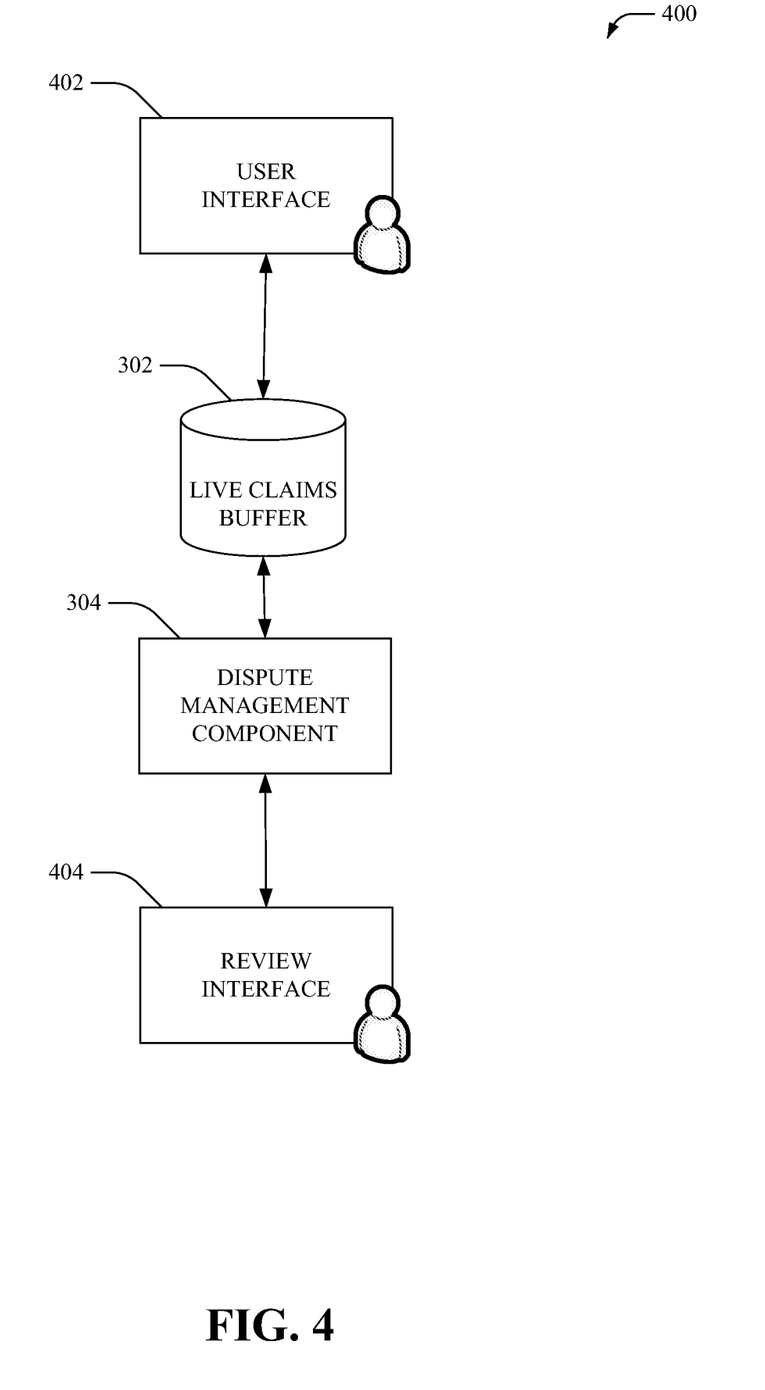
FIG. 4 illustrates an example system for reviewing disputed claims in accordance with implementations of this disclosure.

Referring now to FIG. 4, there is illustrated an example system 400 for reviewing disputed claims in accordance with an aspect of this disclosure. It can be noted that the live claims buffer 302, and dispute management component 304, can include functionality, as more fully described in this disclosure, for example, with regard to systems 100-300.

According to an aspect, one or more claims in the live claims buffer 302 can be disputed by a user, as being incorrectly flagged. By way of example, the user can be notified of a claim against UGC uploaded by the user, via a user interface 402. Moreover, the user interface 402 can facilitate communication with a user device (e.g., computer, laptop, cellular phone, etc.) to enable the user to provide a submission (e.g., a web form) to dispute the claim, for example, for misidentification, a license to use the UGC, and/or fair use. Moreover, the dispute management component 304 can apply a partner-defined policy to resolve and/or manage the disputed claim. In one example, the dispute management component 304 can notify the partner of the disputed claim via a review interface 404. In an aspect, the review interface 404 can enable a partner (and/or network operator) to manually inspect the UGC to facilitate dispute resolution. In one example, if the partner disagrees with the user's dispute (e.g., based on a manual review of the UGC), the dispute management component 304 can block, allow, or "monetize" the UGC, based on instructions received from the partner (e.g., via review interface 404). As an example, the UGC can be monetization by allowing the media hosting/sharing platform to run advertisements next to, along with, prior to, etc., the UGC, and the partner can be provided with at least a portion of the advertisement revenue. In another example, if the partner disagrees with the user's dispute (e.g., based on a manual review of the UGC), the partner can submit a copyright takedown notice (e.g., via review interface 404) and in response the dispute management component 304 can disable the UGC and/or apply a penalty (e.g., a fine, a fee, etc.) against the user's account.

In an example, the user interface 402 and/or review interface 404 can utilize a wizard-based graphical user interface (GUI) that guides the user/partner through a sequence of steps, wherein each step should be completed before advancing to the next step in the series unless the step is optional, of course. Typically, the GUI can include a plurality of related images and interface objects or elements to facilitate retrieval of user submissions and/or instructions. For example, the user interface 402 and/or review interface 404 can facilitate display or rendering of any combination of, among other things, text, text boxes, drop down menus, checkboxes, and buttons which can be interacted with utilizing one or more of a pointing device (e.g., stylus, mouse, trackball, touchpad . . . ), keyword, or voice activated software.

Figure 5:
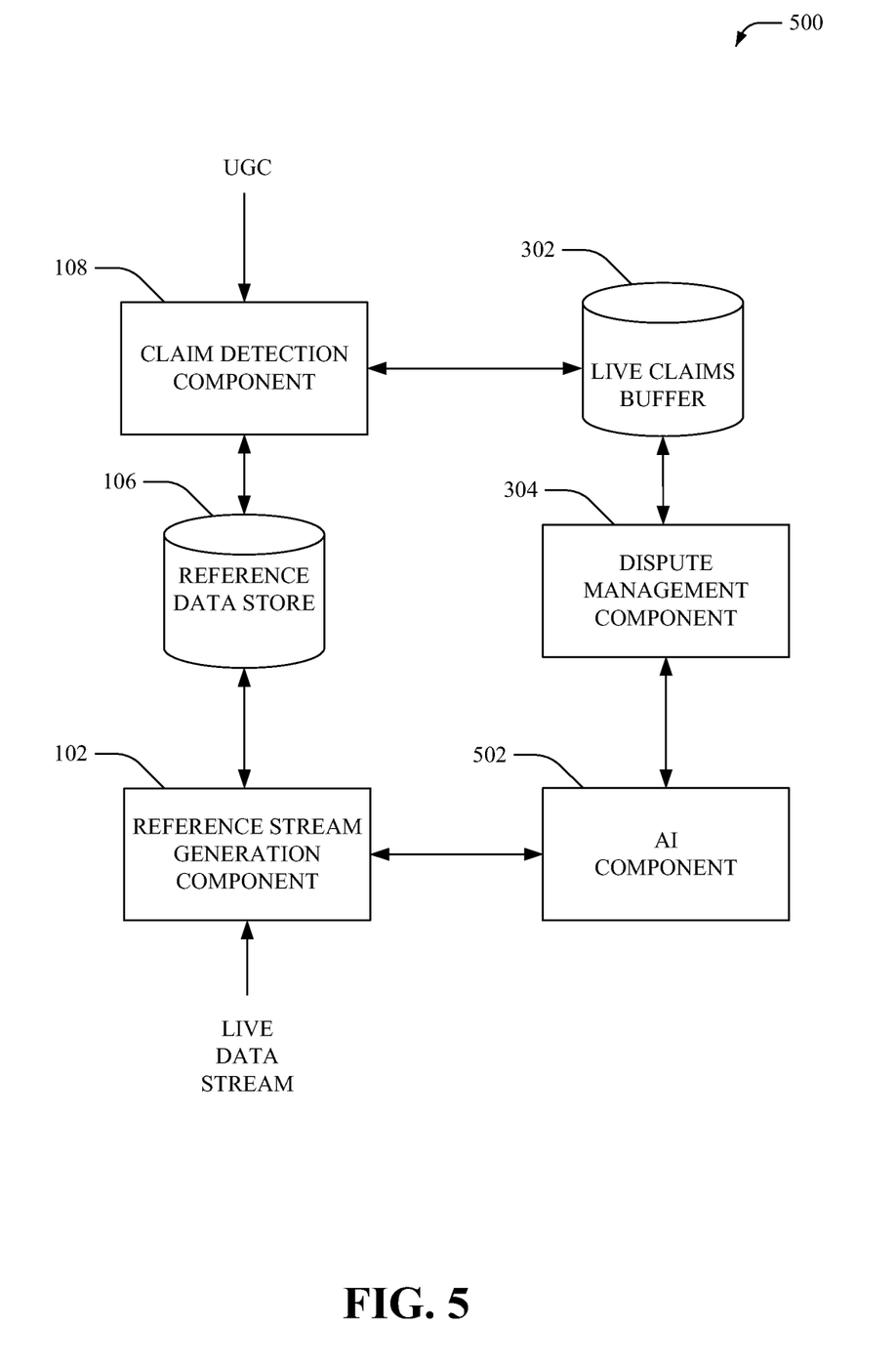
FIG. 5 illustrates an example system that facilitated automating one or more features in accordance with implementations of this disclosure.

Referring now to FIG. 5, there illustrated is an example system 500 that employs an artificial intelligence (AI) component 502, which facilitates automating one or more features in accordance with this specification. It can be appreciated that the reference stream generation component 102, reference data store 106, claim detection component 108, live claims buffer 302, and dispute management component 304, can include respective functionality, as more fully described in this disclosure, for example, with regard to systems 100-400.

This disclosure (e.g., in connection with claim detection, dispute management, etc.) can employ various AI-based schemes for carrying out various aspects thereof. For example, a process for identifying non-live segments within a live data stream, detecting a claim against a UGC, determining how to resolve a claim made in error, etc. can be facilitated via an automatic classifier system and process. The classifier can be or include a function that maps an input attribute vector, x=(x1, x2, x3, x4, xn), to a confidence that the input belongs to a class, that is, f(x)=confidence(class). Such classification can employ a probabilistic and/or statistical-based analysis (e.g., factoring into the analysis utilities and costs) to prognose or infer an action that a user desires to be automatically performed. In the case of media processing systems, for example, attributes can be information stored in data store(s) (e.g., 106, 204, etc.), and the classes can be categories or areas of interest (e.g., levels of priorities). A support vector machine (SVM) is an example of a classifier that can be employed. The SVM operates by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, and probabilistic classification models providing different patterns of independence can be employed. Classification as used in this disclosure also is inclusive of statistical regression that is utilized to develop models of priority.

As will be readily appreciated from this specification, the subject innovation can employ classifiers that are explicitly trained (e.g., via a generic training data) as well as implicitly trained (e.g., via observing audio/video/image data, partner preferences, historical information, receiving extrinsic information). For example, SVMs are configured via a learning or training phase within a classifier constructor and feature selection module. Thus, the classifier(s) can be used to automatically learn and perform a number of functions, including but not limited to determination according to a predetermined criteria proprietary non-live segments within a live data stream, live segments within the live data stream, a policy that is to be applied to facilitate resolution of a dispute, etc. The criteria can include, but is not limited to, historical patterns, audio/video data, partner preferences and/or policies, service provider preferences and/or policies, etc.

Figure 6:
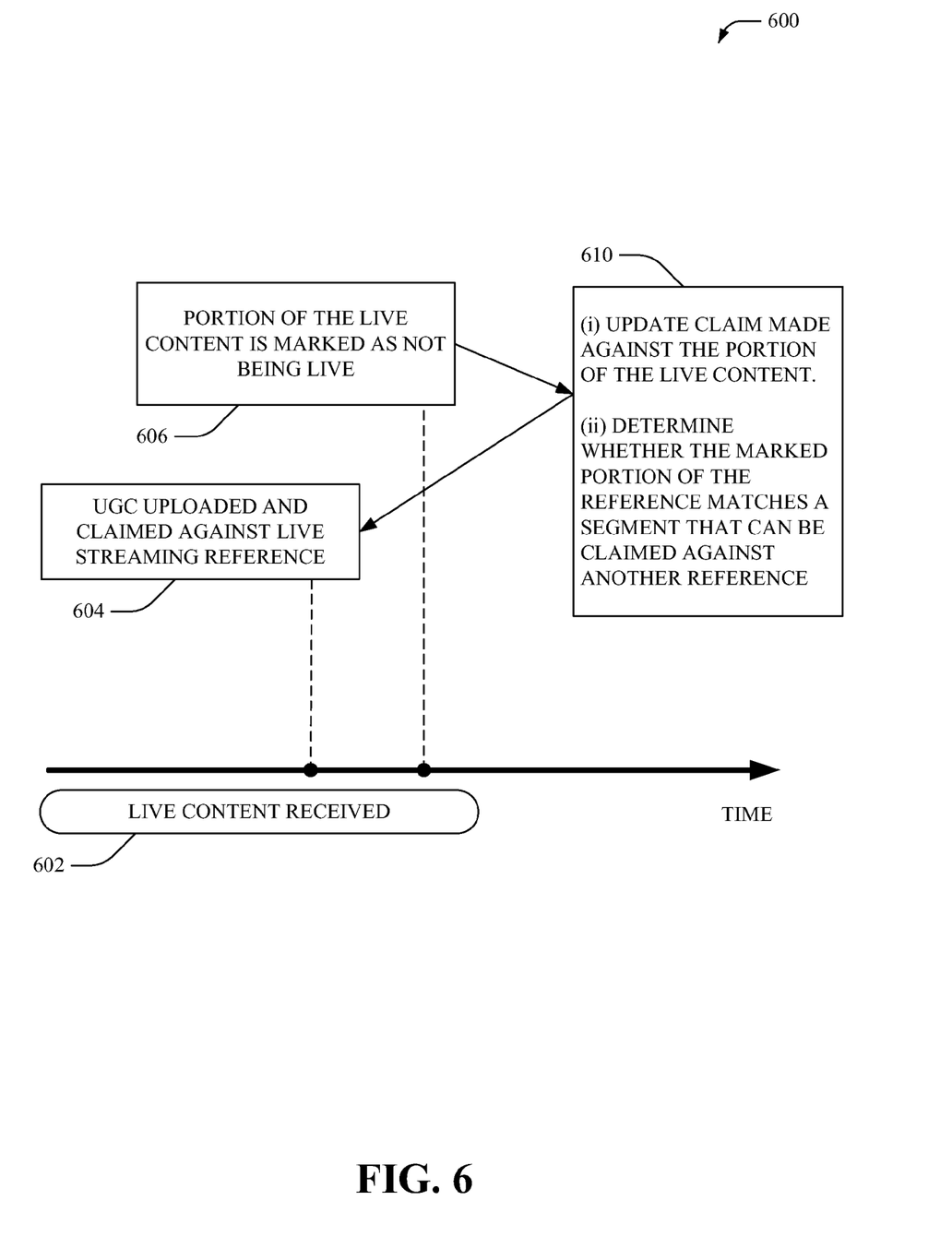
FIG. 6 illustrates an example flow diagram for ex post facto review of claims made against proprietary content in accordance with implementations of this disclosure.
Figure 7:
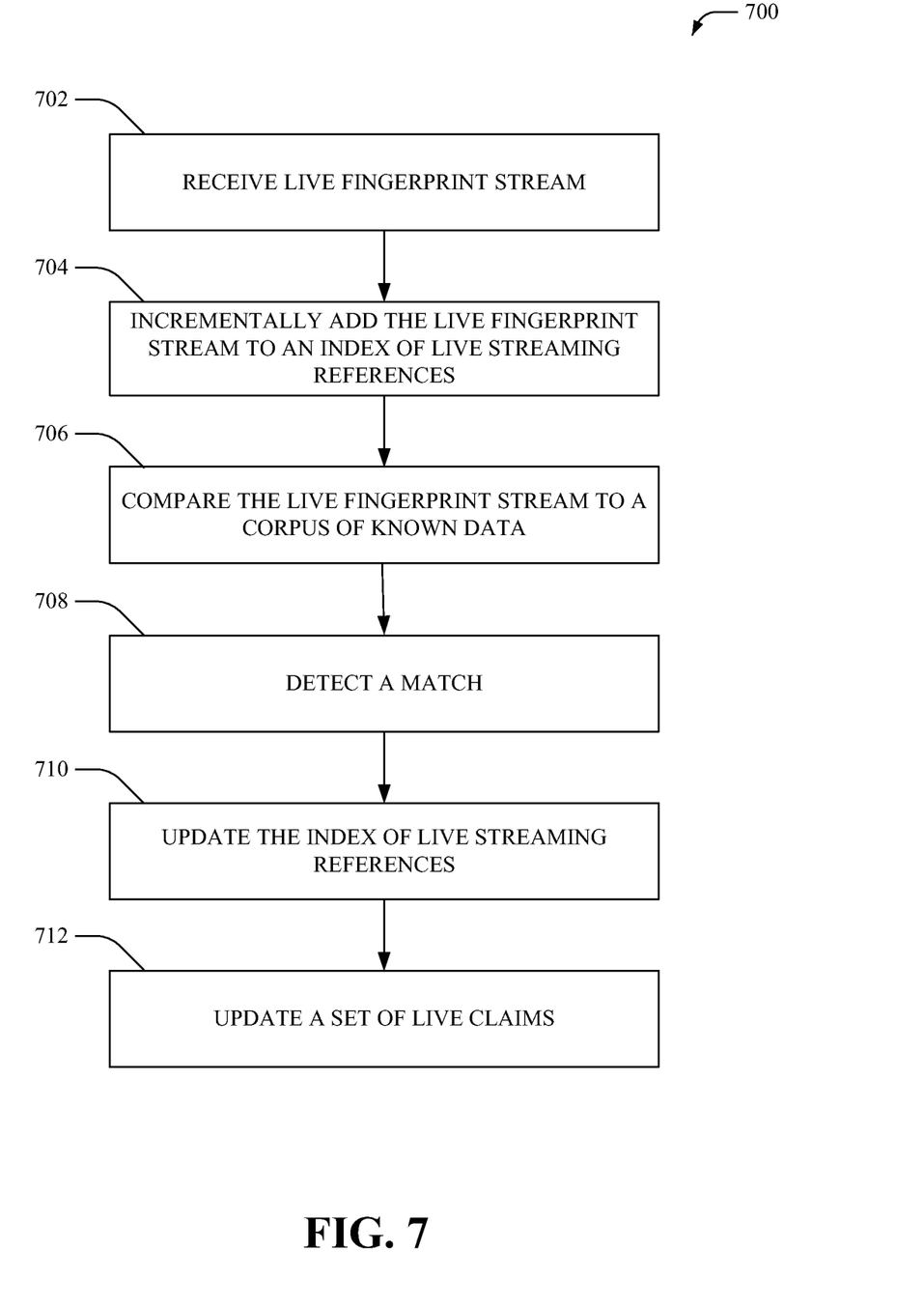
FIG. 7 illustrates an example methodology in accordance with this disclosure for increasing accuracy of claim detection.
Figure 8:
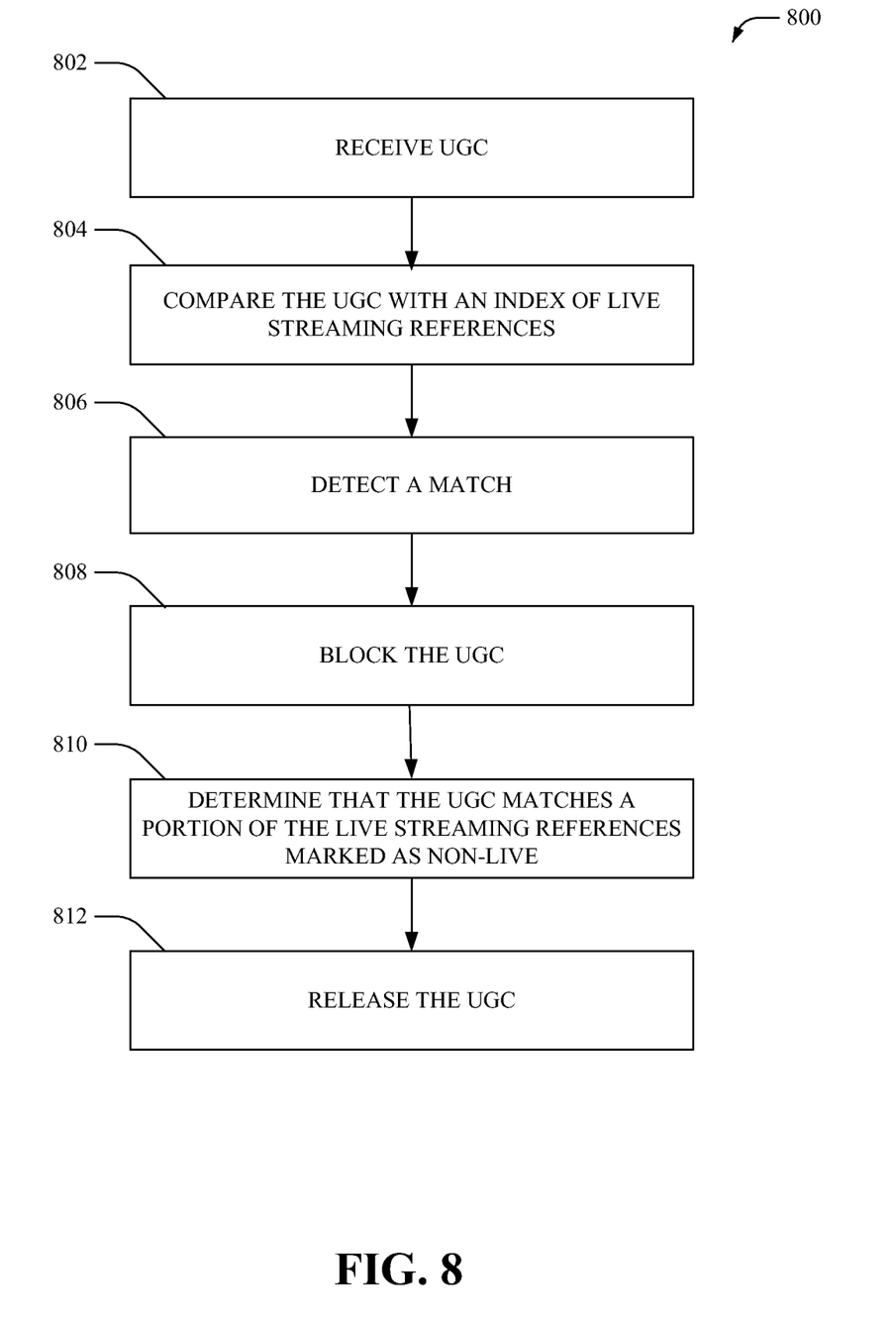
FIG. 8 illustrates an example methodology in accordance with this disclosure that facilitates dispute resolution.

FIGS. 6-8 illustrate flow diagrams and/or methodologies in accordance with implementations of this disclosure. For simplicity of explanation, the flow diagrams and/or methodologies are depicted and described as a series of acts. However, acts in accordance with this disclosure can occur in various orders and/or concurrently, and with other acts not presented and described in this disclosure. Furthermore, not all illustrated acts may be required to implement the methodologies in accordance with the disclosed subject matter. In addition, those skilled in the art will understand and appreciate that the methodologies could alternatively be represented as a series of interrelated states via a state diagram or events. Additionally, it should be further appreciated that the methodologies disclosed in this specification are capable of being stored on an article of manufacture to facilitate transporting and transferring such methodologies to computing devices. The term article of manufacture, as used in this disclosure, is intended to encompass a computer program accessible from any computer-readable device or computer-readable storage/communications media.

FIG. 6 illustrates an example flow diagram 600 for ex post facto review of claims made against proprietary content in accordance with an example timeline. At 602, live content is received. As an example, the live content can include data (e.g., audio and/or video data) associated with a live (or first-shared) event that can further include snippets of non-live material (e.g., flashbacks, replays, advertisements, etc.). In one aspect, the live content can be stored within reference data store 106 and processed by the reference stream generation component 102. At 604, an uploaded UGC can be claimed against the live content, for example, stored within reference data store 106. In one example, the UGC can be queued in the live claims buffer 302 for further review. At 606, portion of the live content can be marked as not being live (e.g., flashbacks, replays, advertisements, etc.), for example, by the reference stream generation component 102. In response, at 610, (i) UGC claims made against the marked portion of the live content can be updated (e.g., cancelled and the UGC can be released), for example, by the dispute management component 304; and/or (ii) it can be determined whether the marked portion of the live content matches a segment that can be claimed against another reference (e.g., by the reference stream generation component 102).

Referring to FIG. 7, there illustrated is a methodology 700 for increasing accuracy of claim detection, according to an aspect of this specification. In one example, methodology 700 can be utilized by a media hosting/sharing platform, for example, to enable rights holders (e.g., partners) to identify infringing UGC. At 702, a live fingerprint stream can be received (e.g., by the reference stream generation component 102). For example, the live fingerprint stream can include video (or data) patterns or structures, such as digital video fingerprints, associated with digital media content related to a live (or near live) event. At 704, the live fingerprint stream can be added to an index of live streaming references (e.g., by the reference stream generation component 102). In one aspect, UGC, uploaded by a user, can be compared to the index of live streaming references to identify claims. Further, at 706, the live fingerprint stream can be compared with a corpus of known (non-live) data (e.g., by the comparison component 202). At 708, a match (or a partial match) can be detected (e.g., by the comparison component 202). In response, at 710, the index of live streaming references can be updated (e.g., by the update component 206). For example, one or more portions of the live fingerprint stream that match at least part of the known corpus, can be removed from the index of live streaming references. Thus, claims being made against non-live portions of a live fingerprint stream can be avoided. In addition, at 712, a set of live claims can be updated, for example, based on the one or more portions of the live fingerprint stream that match at least part of the known corpus. For example, a claim associated with a UGC that matches the one or more portions (e.g., non-live segments) can be deleted and the UGC can be released, broadcasted, and/or shared.

Referring now to FIG. 8, there illustrated is a methodology 800 for dispute resolution, according to an aspect of this specification. In one example, methodology 700 can be utilized by a media hosting/sharing platform, for example, to enable right holders (e.g., partners) to identify infringing UGC. At 802, UGC can be received (e.g., by the claim detection component 108). For example, the UGC can be uploaded by a user via most any communication device and can include data associated with digital media content. At 804, the UGC can be compared with an index of live streaming references (e.g., by the claim detection component 108), for example, that are provided by a partner. Further, at 806, a match can be detected (e.g., by the claim detection component 108). In response, at 808, the UGC can be blocked (e.g., by the claim detection component 108). For example, the UGC can be flagged for review and stored in a buffer until a partner and/or network operator has reviewed the UGC.

Further, the index of live streaming references can be compared with a corpus of known digital media content to identify portions of the live streaming references that relate to non-live events or previously-broadcasted data (e.g., commercials, flashbacks, etc.). Moreover, at 810, it can be determined that the UGC matches a portion of the live streaming references marked as non-live. Accordingly, at 812, the UGC can be released, for example, shared or broadcasted via a media sharing website.

As used herein, the term "video" may refer to visual content alone, or both audio and visual content, as will be understood based on context. Reference throughout this specification to "one embodiment," or "an embodiment," or "one implementation," or "an implementation" means that a particular feature, structure, or characteristic described in connection with the embodiment or the implementation is included in at least one embodiment or implementation. Thus, the appearances of the phrase "in one embodiment," or "in an embodiment," or "in one implementation," or "in an implementation" in various places throughout this specification are not necessarily all referring to the same embodiment or implementation. Furthermore, the particular features, structures, or characteristics may be combined in any suitable manner in one or more embodiments/implementations.

As used in this application, the terms "component," "system," "interface," or the like are generally intended to refer to a computer-related entity, either hardware, a combination of hardware and software, software, or software in execution or an entity related to an operational machine with one or more specific functionalities. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers. Further, a component can come in the form of specially designed hardware; generalized hardware made specialized by the execution of software thereon that enables the hardware to perform specific function (e.g., coding and/or decoding); software stored on a computer readable medium; or a combination thereof. As another example, an interface can include I/O components as well as associated processor, application, and/or API components.

Further, the various embodiments can be implemented as a method, apparatus, or article of manufacture using standard programming and/or engineering techniques to produce software, firmware, hardware, or any combination thereof to control a computer to implement the disclosed subject matter. The term "article of manufacture" as used in this disclosure is intended to encompass a computer program accessible from any computer-readable device or computer-readable storage/communications media. For example, computer readable storage media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Of course, those skilled in the art will recognize many modifications can be made to this configuration without departing from the scope or spirit of the various embodiments. Further, the order in which some or all of the process blocks appear in each process should not be deemed limiting. Rather, it should be understood that some of the process blocks can be executed in a variety of orders that are not illustrated in this disclosure.

Moreover, the words "example" or "exemplary" are used in this disclosure to mean serving as an example, instance, or illustration. Any aspect or design described in this disclosure as "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X employs (or uses) A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

The systems and processes described below can be embodied within hardware, such as a single integrated circuit (IC) chip, multiple ICs, an application specific integrated circuit (ASIC), or the like. Further, the order in which some or all of the process blocks appear in each process should not be deemed limiting. Rather, it should be understood that some of the process blocks can be executed in a variety of orders that are not all of which may be explicitly illustrated in this disclosure Referring now to FIG. 9, there is illustrated a block diagram of a computer operable to execute the disclosed gesture recognition architecture. In order to provide additional context for various aspects of this specification, FIG. 9 and the following discussion are intended to provide a brief, general description of a suitable computing environment 900 in which the various aspects of the specification can be implemented. While the specification has been described above in the general context of computer-executable instructions that can run on one or more computers, those skilled in the art will recognize that the specification also can be implemented in combination with other program modules and/or as a combination of hardware and software.

Program modules can include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the specification can also be practiced in distributed computing environments where certain tasks are performed by remote processing devices that are linked through a communications network. In a distributed computing environment, program modules can be located in both local and remote memory storage devices.

Computing devices can include a variety of media, which can include computer-readable storage media and/or communications media, which two terms are used in this disclosure differently from one another as follows. Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

Communications media can embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared, and other wireless media.

With reference again to FIG. 9, the example environment 900 for implementing various aspects of the specification, relating to claim detection and/or dispute management, includes a computer 902, the computer 902 including a processing unit 904, a system memory 906 and a system bus 908. It is to be appreciated that the computer 902 can be used in connection with implementing one or more of the systems or components shown and described in connection with FIGS. 1-5. The system bus 908 couples system components including, but not limited to, the system memory 906 to the processing unit 904. The processing unit 904 can be any of various commercially available processors. Dual microprocessors and other multi-processor architectures can also be employed as the processing unit 904.

Figure 9:
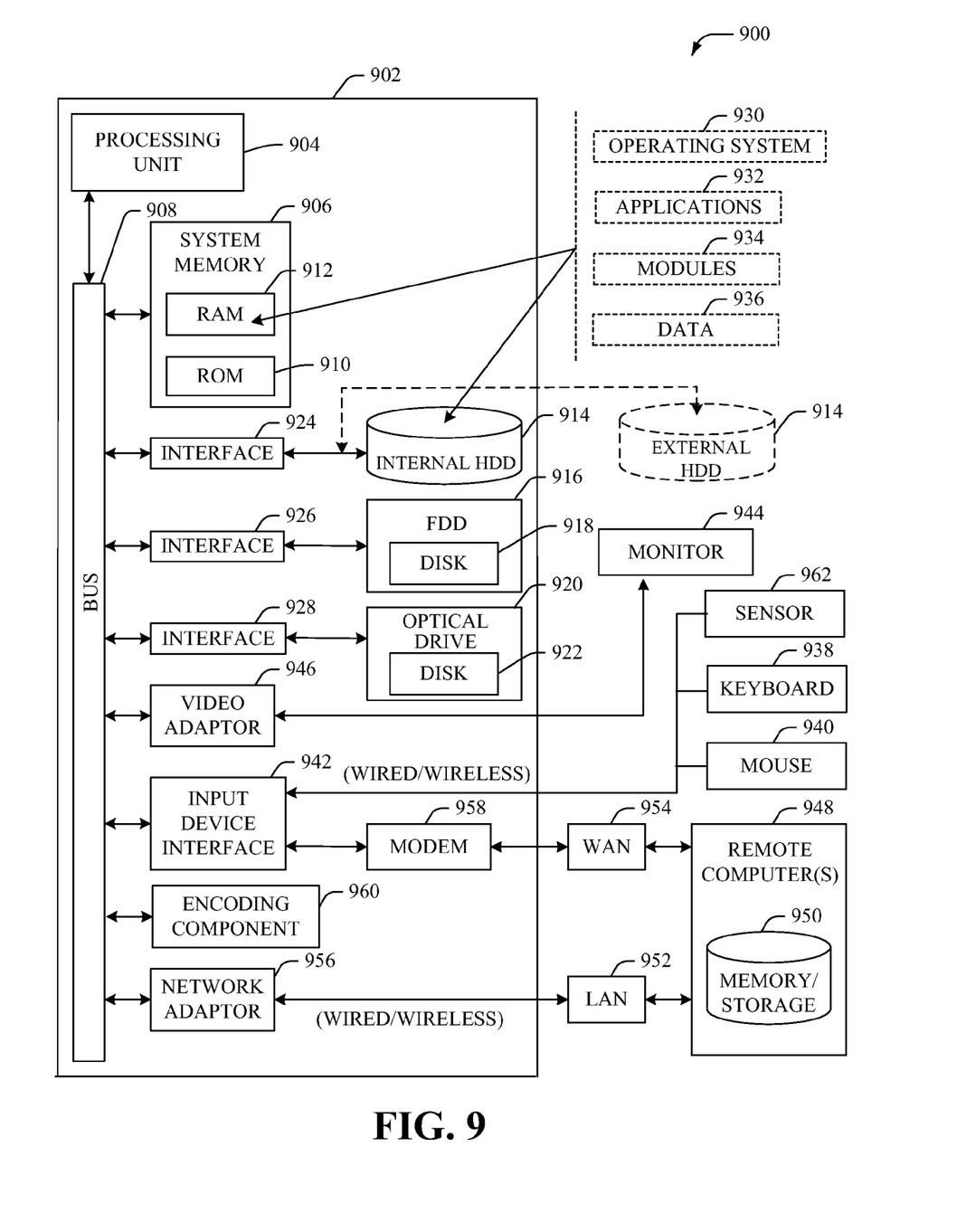
FIG. 9 illustrates a block diagram representing an exemplary non-limiting computing system or operating environment in which various embodiments can be implemented; and, FIG. 10 illustrates a schematic block diagram representing an exemplary non-limiting computing environment in which the various embodiments can be implemented.

The system bus 908 can be any of several types of bus structure that can further interconnect to a memory bus (with or without a memory controller), a peripheral bus, and a local bus using any of a variety of commercially available bus architectures. The system memory 906 includes read-only memory (ROM) 910 and random access memory (RAM) 912. A basic input/output system (BIOS) is stored in a non-volatile memory 910 such as ROM, EPROM, EEPROM, which BIOS contains the basic routines that help to transfer information between elements within the computer 902, such as during startup. The RAM 912 can also include a high-speed RAM such as static RAM for caching data.

The computer 902 can further include an internal hard disk drive (HDD) 914 (e.g., EIDE, SATA), which internal hard disk drive 914 can also be configured for external use in a suitable chassis (not shown), a magnetic floppy disk drive (FDD) 916, (e.g., to read from or write to a removable diskette 918) and an optical disk drive 920, (e.g., reading a CD-ROM disk 922 or, to read from or write to other high capacity optical media such as the DVD). The hard disk drive 914, magnetic disk drive 916 and optical disk drive 920 can be connected to the system bus 908 by a hard disk drive interface 924, a magnetic disk drive interface 926 and an optical drive interface 928, respectively. The interface 924 for external drive implementations includes at least one or both of Universal Serial Bus (USB) and IEEE 1394 interface technologies. Other external drive connection technologies are within contemplation of this specification.

The drives and their associated computer-readable storage media provide nonvolatile storage of data, data structures, computer-executable instructions, and so forth. For the computer 902, the drives and storage media accommodate the storage of any data in a suitable digital format. Although the description of computer-readable storage media above refers to a HDD, a removable magnetic diskette, and a removable optical media such as a CD or DVD, it should be appreciated by those skilled in the art that other types of storage media which are readable by a computer, such as zip drives, magnetic cassettes, flash memory cards, cartridges, and the like, can also be used in the example operating environment, and further, that any such storage media can contain computer-executable instructions for performing the methods of the specification.

A number of program modules can be stored in the drives and RAM 912, including an operating system 930, one or more application programs 932, other program modules 934 and program data 936. All or portions of the operating system, applications, modules, and/or data can also be cached in the RAM 912. It is appreciated that the specification can be implemented with various commercially available operating systems or combinations of operating systems.

A user can enter commands and information into the computer 902 through one or more wired/wireless input devices, e.g., a keyboard 938 and a pointing device, such as a mouse 940. Additionally or alternatively, a sensor 962, including but not limited to a camera, can be utilized to capture input data. Other input devices (not shown) can include a microphone, an IR remote control, a joystick, a game pad, a stylus pen, touch screen, or the like. These and other input devices are often connected to the processing unit 904 through an input device interface 942 that is coupled to the system bus 908, but can be connected by other interfaces, such as a parallel port, an IEEE 1394 serial port, a game port, a USB port, an IR interface, etc.

A monitor 944 or other type of display device is also connected to the system bus 908 via an interface, such as a video adapter 946. In addition to the monitor 944, a computer can include other peripheral output devices (not shown), such as speakers, printers, etc. The computer 902 can include an encoding component 960 (e.g., encoder, codec), which can include at least one encoder that consists of hardware, a combination of hardware and software, or software. Although, the encoding component 960 is depicted as a separate component, the encoding component 960 can be contained within non-volatile memory 910.

The computer 902 can operate in a networked environment using logical connections via wired and/or wireless communications to one or more remote computers, such as a remote computer(s) 948. The remote computer(s) 948 can be a workstation, a server computer, a router, a personal computer, portable computer, microprocessor-based entertainment appliance, a peer device or other common network node, and can include many or all of the elements described relative to the computer 902, although, for purposes of brevity, only a memory/storage device 950 is illustrated. The logical connections depicted include wired/wireless connectivity to a local area network (LAN) 952 and/or larger networks, e.g., WAN 954. Such LAN and WAN networking environments are commonplace in offices and companies, and facilitate enterprise-wide computer networks, such as intranets, all of which can connect to a global communications network, e.g., the Internet.

When used in a LAN networking environment, the computer 902 is connected to the local network 952 through a wired and/or wireless communication network interface or adapter 956. The adapter 956 can facilitate wired or wireless communication to the LAN 952, which can also include a wireless access point disposed thereon for communicating with the wireless adapter 956.

When used in a WAN networking environment, the computer 902 can include a modem 958, or is connected to a communications server on the WAN 954, or has other means for establishing communications over the WAN 954, such as by way of the Internet. The modem 958, which can be internal or external and a wired or wireless device, is connected to the system bus 908 via the serial port interface 942. In a networked environment, program modules depicted relative to the computer 902, or portions thereof, can be stored in the remote memory/storage device 950. It will be appreciated that the network connections shown are example and other means of establishing a communications link between the computers can be used.

The computer 902 is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. In one example embodiment, wireless communications can be facilitated, for example, using Wi-Fi, Bluetooth®, Zigbee, and other 802.XX wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, n etc.) to provide secure, reliable, fast wireless connectivity. A Wi-Fi network can be used to connect computers to each other, to the Internet, and to wired networks (which use IEEE 802.3 or Ethernet). Wi-Fi networks can operate in the unlicensed 2.4 and 5 GHz radio bands, at an 11 Mbps (802.11a), 54 Mbps (802.11b), or 150 Mbps (802.11n) data rate, for example, or with products that contain both bands (dual band), so the networks can provide real-world performance similar to wired Ethernet networks used in many homes and offices.

Figure 10:
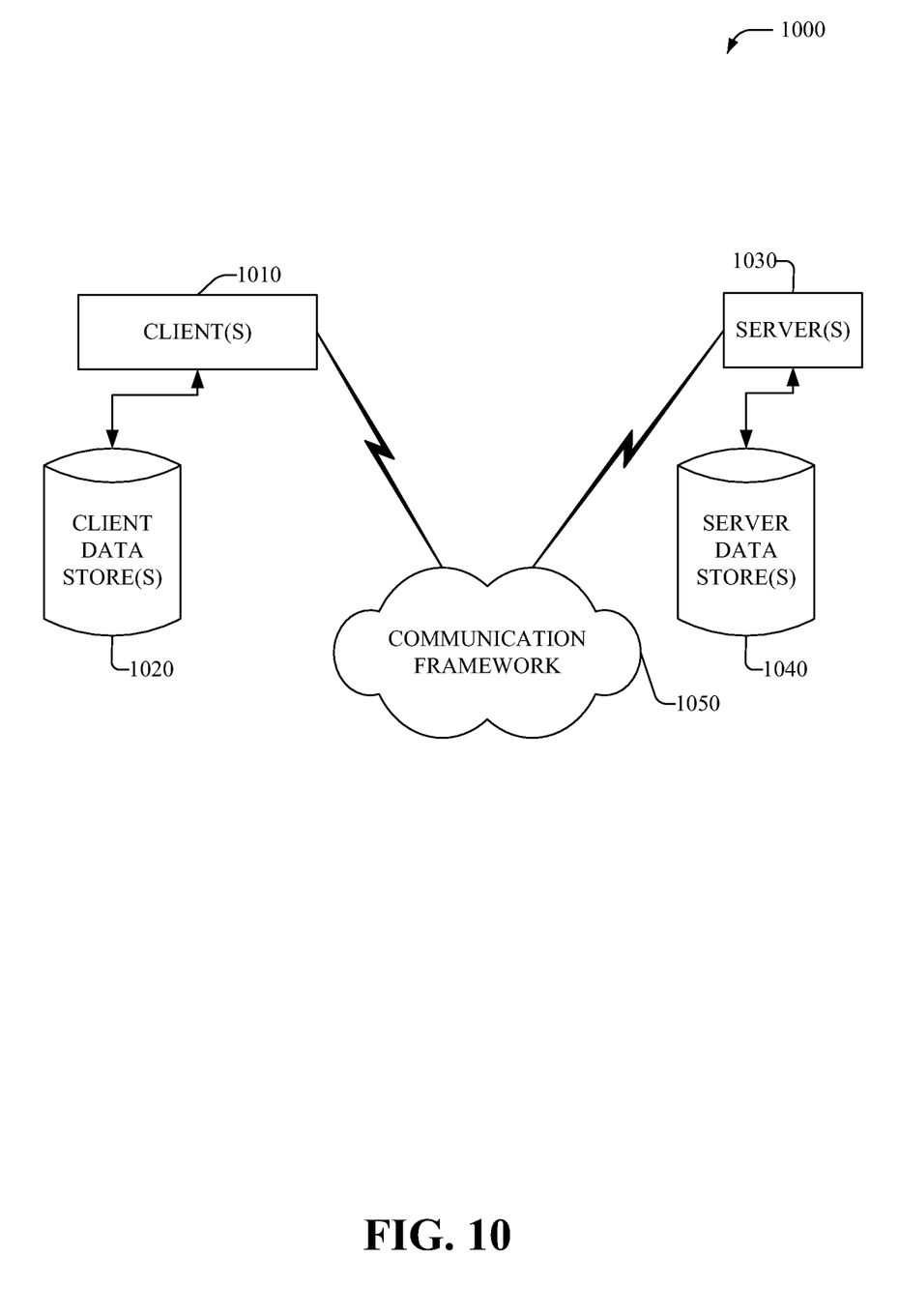

FIG. 10 is a schematic block diagram of a sample-computing environment 1000 with which the subject matter of this disclosure can interact. The system 1000 includes one or more client(s) 1010. The client(s) 1010 can be hardware and/or software (e.g., threads, processes, computing devices). The system 1000 also includes one or more server(s) 1030. Thus, system 1000 can correspond to a two-tier client server model or a multi-tier model (e.g., client, middle tier server, data server), amongst other models. The server(s) 1030 can also be hardware and/or software (e.g., threads, processes, computing devices). The servers 1030 can house threads to perform transformations by employing this disclosure, for example. One possible communication between a client 1010 and a server 1030 can be in the form of a data packet transmitted between two or more computer processes.

The system 1000 includes a communication framework 1050 that can be employed to facilitate communications between the client(s) 1010 and the server(s) 1030. The client(s) 1010 are operatively connected to one or more client data store(s) 1020 that can be employed to store information local to the client(s) 1010. Similarly, the server(s) 1030 are operatively connected to one or more server data store(s) 1040 that can be employed to store information local to the servers 1030.

As it employed in this specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described in this disclosure. Processors can exploit nano-scale architectures such as, but not limited to, molecular and quantum-dot based transistors, switches and gates, in order to optimize space usage or enhance performance of user equipment. A processor may also be implemented as a combination of computing processing units.

In this specification, terms such as "data store," data storage," "database," "buffer," and substantially any other information storage component relevant to operation and functionality of a component, refer to "memory components," or entities embodied in a "memory" or components comprising the memory. It will be appreciated that the memory components, or computer-readable storage media, described in this disclosure can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), and enhanced SDRAM (ESDRAM). Additionally, the disclosed memory components of systems or methods in this disclosure are intended to comprise, without being limited to comprising, these and any other suitable types of memory.

What has been described above includes examples of the embodiments of the present invention. It is, of course, not possible to describe every conceivable combination of components or methodologies for purposes of describing the claimed subject matter, but it is to be appreciated that many further combinations and permutations of this innovation are possible. Accordingly, the claimed subject matter is intended to embrace all such alterations, modifications, and variations that fall within the spirit and scope of the appended claims. Moreover, the above description of illustrated embodiments of this disclosure, including what is described in the Abstract, is not intended to be exhaustive or to limit the disclosed embodiments to the precise forms disclosed. While specific embodiments and examples are described in this disclosure for illustrative purposes, various modifications are possible that are considered within the scope of such embodiments and examples, as those skilled in the relevant art can recognize In particular and in regard to the various functions performed by the above described components, modules, systems and the like, the terms used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the claimed subject matter. The aforementioned systems, devices, and circuits have been described with respect to interaction between several components and/or blocks. It can be appreciated that such systems, devices, circuits, and components and/or blocks can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it should be noted that one or more components may be combined into a single component providing aggregate functionality or divided into several separate sub-components, and any one or more middle layers, such as a management layer, may be provided to communicatively couple to such sub-components in order to provide integrated functionality. Any components described in this disclosure may also interact with one or more other components not specifically described in this disclosure but known by those of skill in the art.

In addition, while a particular feature of this innovation may have been disclosed with respect to only one of several implementations, such feature may be combined with one or more other features of the other implementations as may be desired and advantageous for any given or particular application. Furthermore, to the extent that the terms "includes," "including," "has," "contains," variants thereof, and other similar words are used in either the detailed description or the claims, these terms are intended to be inclusive in a manner similar to the term "comprising" as an open transition word without precluding any additional or other elements.

What is claimed is:

1. A system, comprising:
 a memory that has stored thereon computer executable components;
 a processor that executes the following computer executable components stored in the memory:

a reference stream generation component that updates a set of reference data streams associated with live content based on an extraction of data that is determined to be non-live content and stores the updated set of reference data streams in a reference data store; and a claim detection component that compares user generated content with information stored within the reference data store to facilitate dispute management.

2. The system of claim 1, wherein the claim detection component flags the user generated content for further review, in response to determination of at least a partial match between the user generated content and the information.

3. The system of claim 2, wherein the claim detection management component delays at least one of broadcasting, sharing, or publishing of the user generated content for a predefined time period, in response to the user generated content being flagged.

4. The system of claim 2, further comprising:
a dispute management component that compares the user generated content with the data that is determined to be the non-live content, subsequent to the user generated content being flagged.

5. The system of claim 4, wherein the dispute management component applies a partner-defined policy to the user generated content, in response to determining that the user generated content does not match the data that is determined to be the non-live content.

6. The system of claim 5, wherein the partner-defined policy comprises at least one of blocking, allowing, or monetizing the user generated content.

7. The system of claim 4, wherein the dispute management component at least one of broadcasts, shares, or publishes the user generated content, in response to determining that the user generated content matches at least a portion of the data that is determined to be the non-live content.

8. The system of claim 4, wherein the dispute management component communicates with a review interface to facilitate a manual review of the user generated content.

9. The system of claim 1, wherein the reference stream generation component compares a live data stream with a corpus of known content to facilitate a determination of the non-live content.

10. The system of claim 1, wherein the non-live content comprises advertisement data.

11. The system of claim 1, wherein the reference stream generation component receives user input to facilitate a determination of the non-live content.

12. A method, comprising:
using a processor to execute computer executable instructions stored in a memory to perform the following operations:

receiving a data stream that comprises time-sensitive content;

storing a reference data stream that is determined based on removing a portion of known content from the data stream; and comparing user generated content with the reference data stream to facilitate dispute management.

13. The method of claim 12, wherein the operations further comprise:
blocking the user generated content for a predefined amount of time based on the comparing.

14. The method of claim 12, wherein the operations further comprise:
comparing the portion of known content with claim data stored in a claims buffer; and in response to the portion of known content being determined to match at least a portion of the claim data, cancelling a claim corresponding to at least the portion of the claim data.

15. The method of claim 14, wherein the comparing comprises comparing the portion of known content with the claim data subsequent to the storing.

16. The method of claim 12, wherein the operations further comprise:
determining the portion of known content based on comparing the data stream with a set of known content.

17. The method of claim 12, wherein the operations further comprise:
determining the portion of known content based on a manual input.

18. A non-transitory computer readable storage medium comprising computer-executable instructions that, in response to execution, cause a system comprising a processor to perform operations, comprising:
determining a portion of known content within a live data stream;

storing a reference data stream that is determined based on extracting the portion of known content from the live data stream; and comparing user generated content with the reference data stream to facilitate dispute management.

19. The non-transitory computer readable storage medium of claim 18, wherein the operations further comprise:
delaying a release of the user generated content for a predefined amount of time based on the comparing.

20. The non-transitory computer readable storage medium of claim 19, wherein the operations further comprise:
releasing the user generated content after the predefined amount of time.

* * * * *